United States Patent [19]

Rapp

[11] 4,257,901

[45] Mar. 24, 1981

[54] CLEANABLE FILTER AND METHOD OF CLEANING SAME

[75] Inventor: Willard E. Rapp, Griggstown, N.J.

[73] Assignee: Western Electric Co., Inc., New York, N.Y.

[21] Appl. No.: 65,808

[22] Filed: Aug. 13, 1979

[51] Int. Cl.³ .............................................. B01D 23/24
[52] U.S. Cl. ............................. 210/791; 210/DIG. 15; 210/97; 210/138; 210/232; 210/408; 210/413; 366/87; 425/197; 425/199
[58] Field of Search ..................... 425/197, 198, 199; 366/87; 210/498, 408, 186, 179, 71, DIG. 15, 97, 138, 232, 413

[56] References Cited

U.S. PATENT DOCUMENTS

| | | | |
|---|---|---|---|
| 642,814 | 2/1900 | Cowen | 210/773 |
| 1,195,576 | 8/1916 | Garrahan | 241/84 |
| 2,661,497 | 12/1953 | Birmingham | 18/12 |
| 2,878,512 | 3/1959 | Davis | 18/12 |
| 2,990,576 | 7/1961 | Van Riper | 425/197 |
| 3,007,199 | 11/1961 | Curtis | 18/12 |
| 3,059,276 | 10/1962 | Yokana | 18/12 |
| 3,797,665 | 3/1974 | Paquette | 210/236 |
| 3,804,758 | 4/1974 | Cooper et al. | 210/DIG. 15 |
| 3,811,659 | 5/1974 | Taylor et al. | 210/498 |
| 3,817,377 | 6/1974 | Piggott | 210/DIG. 15 |
| 3,843,062 | 10/1974 | Neidl | 210/415 |
| 3,856,277 | 12/1974 | Tiramani | 210/65 |
| 3,900,546 | 8/1975 | Kaukeinen | 264/102 |
| 3,940,335 | 8/1973 | Kalman | 210/179 |
| 4,019,987 | 4/1977 | Krasnow | 210/232 |
| 4,021,346 | 5/1977 | Berthiaume | 210/DIG. 15 |
| 4,025,434 | 5/1977 | Mladota | 425/197 |
| 4,046,359 | 9/1977 | Gellert | 210/488 |
| 4,082,487 | 4/1978 | Rapp | 425/135 |
| 4,177,234 | 12/1979 | Lowry | 210/415 |

*Primary Examiner*—Theodore A. Granger
*Attorney, Agent, or Firm*—J. F. Spivak

[57] ABSTRACT

A filter assembly for an extrusion apparatus comprises a stationary filter having a flat, hard surface and slidable means having a plurality of apertures for both accumulating filtered debris and cleaning the filter surface when the debris is removed by sliding a clogged slide aperture out of position while replacing it with a clean aperture.

12 Claims, 7 Drawing Figures

CLEANABLE FILTER AND METHOD OF CLEANING SAME

TECHNICAL FIELD

The present invention relates to a filter or screen and methods of cleaning the filter or screen, in situ, and more particularly, to extrusion apparatus having filter or screen devices which are cleanable in situ.

BACKGROUND OF THE INVENTION

The use of screen or filter devices for filtering extruded material such as plastics or rubber is well known. Filtering is particularly useful when extruding recycled plastics or rubber in order to remove particles of dirt or foreign matter from the recycled material. Filters utilized in such recycling operations are, however, particularly subject to clogging. Accordingly, the changing of screen devices or filter elements at frequent intervals has been necessary.

Mechanisms for changing screen devices associated with plastic extruders are well known. Examples of such devices can be seen with reference, for example, to U.S. Pat. Nos. 642,814; 1,195,576; 3,797,665; and 4,019,987. Typically, such mechanisms include a slide assembly which moves a clean filter screen contained in a support into the path of the extrudate while simultaneously moving the used, clogged filter screen to a standby station where the screen itself is replaced. Most screening or filtering media used for filtering extruded plastic materials are discarded and replaced with new screening material. Discarding of such screens, such as wire mesh screens, becomes more and more costly as the frequency interval between required screen changes becomes shorter. Furthermore, the replacement or change from a clogged screen to a clean screen should be done relatively rapidly or in a manner so that a clean screen can readily be provided in the extrusion path with no or minimal interruption of the extrusion process. In fact, automatic screen cleaning would be a desirable feature, not only to minimize the replacement time, but also to minimize any inconvenience associated with manual replacement. Generally, all of the known screen changers effect replacement of the dirty screen devices manually. Exceptions to this are the automatic screen changers described in my prior U.S. Pat. No. 4,082,487 and my application Ser. No. 972,633. In all instances, however, known methods and devices for providing clean screen surfaces to replace dirty clogged screen surfaces in extrusion apparatus operate by actually moving the screen or filter and replacing the screen or filter with a fresh one. It would be highly desirable to have a filtering device or mechanism associated with an extrusion apparatus wherein the screen or filter itself may be cleaned in situ while the extrusion operation proceeds and wherein the screen or filter element need not be disposed of, but rather, can be re-used after cleaning for extended periods of time. By further providing an automatic means for accomplishing the above, a substantial saving in both labor and screen materials may be achieved.

SUMMARY OF THE INVENTION

In accordance with the present invention, there is provided a filter element having a hard flat surface which is capable of being scraped clean. The filter element is provided with a multiplicity of small apertures of relatively small depth backed up by a thicker rigid plate portion having larger apertures, each large aperture being registered with a plurality of the smaller apertures. The larger apertures extend through the remainder of the filter element providing openings on the second or back major surface thereof. The filter element may be made of one piece or may be a composite of pieces mounted together. The face of the filter element being hard and flat allows cleaning of the filter such as by means of scraping means passing over the surface.

In conjunction with the novel filter element, there is provided a filtering head for supporting the filter in a fixed position in alignment with an extrudable material of an extrusion apparatus together with means for scraping the front surface of the filter so as to clean the filter in situ while the extrusion process continues.

The novel method of the invention includes the step of extruding material through a fixed filtering element wherein the filtering element has a flat hard surface, and during continuation of the extrusion process, cleaning the filter element by passing a means for scraping the surface of the filtering element over and in contact with the front surface of said element, thereby removing accumulated material which tends to clog the filter.

DETAILED DESCRIPTION

Figure 1:
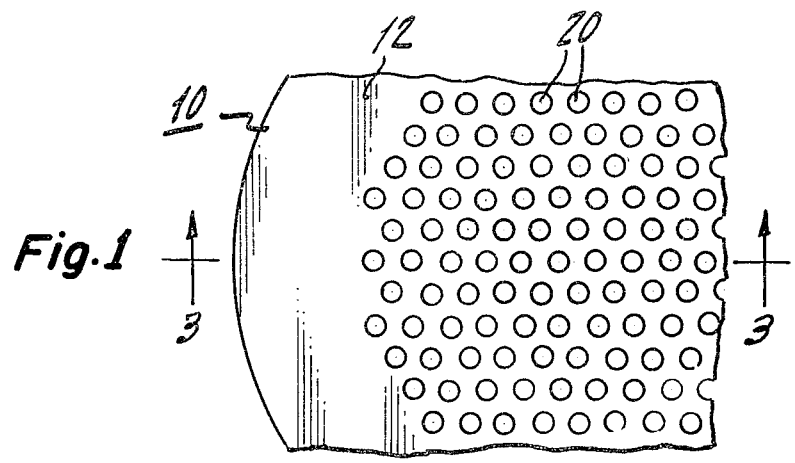
FIG. 1 is a top elevational view of a portion of an embodiment of the novel filter element.
Figure 2:
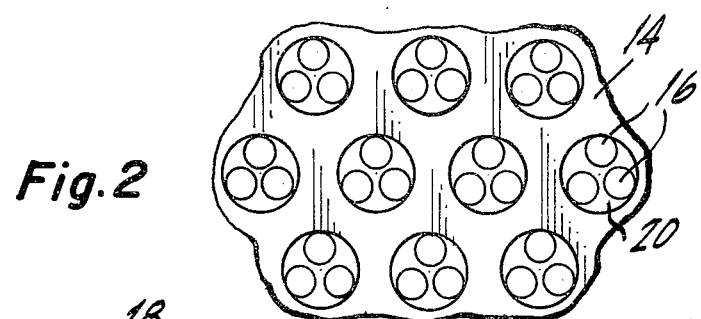
FIG. 2 is a blow-up of a small portion as viewed from the back of the filter element shown in FIG. 1 to better show the registration of the front apertures with those of the back apertures.
Figure 3:
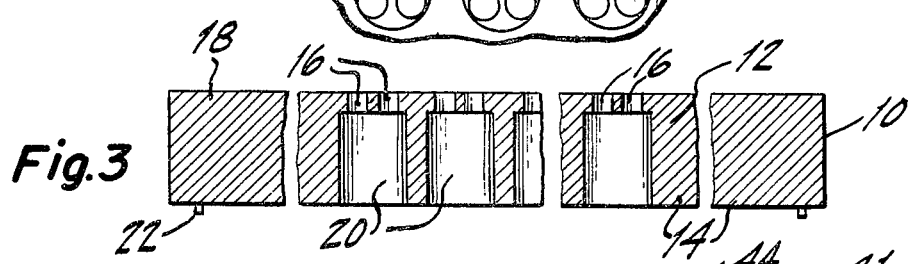
FIG. 3 is a side cross-sectional cut away view of a small portion of the novel one-piece filter.

Referring to FIGS. 1-3 there is shown a novel filter made in accordance with this invention. The filter 10 is disc shaped having two major surfaces, a front surface 12 and a back surface 14. Flow of material to be filtered proceeds from the front surface 12 towards the back surface 14. The front surface 12 is provided with a regular array of small apertures 16 which extend only a short distance into the body 18 of the filter 10 and start a distance from the edge of the disc so as to leave an unperforated border for added strength and rigidity of the filter 10. Larger apertures 20 extend from the back surface 14 of the filter 10 into the body 18 of the filter 10 to where they meet and join with the small apertures 16 extending from the front surface 12 of the filter 10. Each large aperture 20 is associated and registered with a plurality of small apertures 16. This can be best seen in FIG. 2, which is a view of a portion of the filter element 10 looking from the back surface 14 thereof, where there is shown a plurality of regularly spaced large apertures 20, each large aperture being associated with three smaller apertures 16 which register with the large aperture 20 such that their centers form a triangular array within the large aperture 20. The back surface 14 of the filter 10 may be provided with teats 22 extending therefrom. The teats may be used to seat the filter in position in the filter head or on a back-up plate to be described hereinafter. The filter element 10 as described above is a one-piece rigid filter having a flat upper surface 12 and is preferably made of a hard material such as a hard steel or the like. The hard surface is necessary where long filter life is desired when used in accordance with the present invention. It is essential for long life that the front surface 12 of the filter be capable of being scraped without being damaged or significantly worn away.

Figure 4:
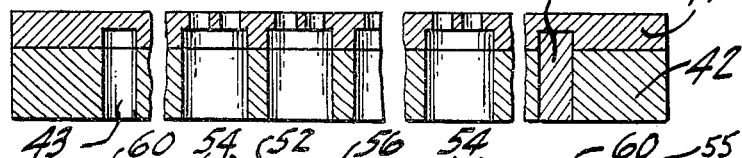
FIGS. 4 and 5 are side cross-sectional cut away views representing portions of multiple-piece filter elements according to this invention.

While the filter 10 described above is of a one-piece design, a novel filter element in accordance with this invention may be formed of more than one piece to comprise the novel filter element. For example, with reference to FIG. 4, there is shown a two-piece filter element 40 wherein the top portion 41 is essentially the same general configuration as the unitary filter described with reference to FIGS. 1-3 and the bottom portion or back-up plate 42 is of the same outer dimensions as portion 41 and is provided with a flat front surface 43 so as to fit flush against the back surface of the front portion 41. The back-up plate 42 is provided with a plurality of large apertures 44 extending therethrough which are of the same size as the large apertures 45 of the front portion 41 and which are registered therewith. The plates may be bonded together by such means as spot welding, applying an adhesive around the outer perimeter of the joining surfaces of the plates or by providing a through hole 46 with a dowel pin 47 which extends through the back-up plate 42 and into the back portion of the front plate 41. Again, the front surface 48 of the filter 40 must be flat and should be made of a hard material.

Figure 5:
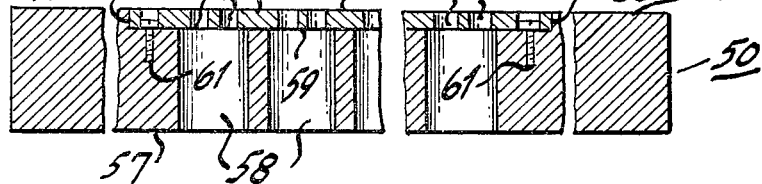

Still another variation of an embodiment of the invention is shown in FIG. 5. In accordance with this embodiment, the filter element 50 is also of a two-piece construction. Here, one piece is a thin member 52 having a multiplicity of small apertures 54 in a regular array extending therethrough. A border 55 without filter apertures 54 is provided around the member 52. The surface 56 of member 52 must be flat and is preferably made of a hard material such as tool steel to withstand wear from scraping action across the surface 56. The member 52 is seated within a back-up plate 57 in order to give the member 52 rigidity and support. The back-up plate 57 is provided with a plurality of large apertures 58, each of which is registered with and associated with a group of small apertures 54 similar to the previously described filter elements. As shown in FIG. 5, the thin member 52 lies within a groove or depression provided in the top surface of the back-up plate 57 such that the top surface 56 of the member 52 and the top surface 59 of the back-up plate 57 are flush one with the other. Alternatively, the top surface 59 of the back-up plate may lie below the top surface 56 of the filter member 52 but in no instances should it be above that member as this would prevent or impair the ability to clean the surface of the filter member 52 by means of scraping action across its surface. Furthermore, by seating the member 52 within a depression in the back-up plate 57 such that the outer peripheral edges of the member 52 abut a side wall 60 of the back-up plate 57, added rigidity and support as well as lateral stability of the member 52 is attained. Member 52 can be attached to the back-up plate 57 by bonding means, locating pins extending from member 52 and registered with locating pin holes provided in the back-up plate 54, or, as shown, by means of a plurality of screws 61 around the border of member 52 extending therethrough into back-up plate 57. The heads of any such screws 61 must remain below the surface 56 or flush with the surface 56 of member 52.

In any of the filters described above, the aperture sizes of the small apertures are selected based upon the desired size of particles to be filtered from any extrudate. The size of the larger apertures is then controlled by the particular grouping of smaller apertures to be associated with each of the larger apertures. During the filtration process any particle passing through the smaller apertures can readily pass through the larger apertures. Consequently, there is no clogging of the filter in the larger aperture. Depending upon the requirements of particle size to be filtered and the ability to attain structural integrity of the filter element, it would be desirable for the depth of the smaller apertures to be no more than one-half the diameter of those apertures such that any particles trapped at the surface of the smaller aperture can readily pass therethrough when sheared by scraping means which pass over the surface of the aperture. While this configuration may be desirable, it is not necessary in the practice of this invention.

While the novel filter element is described herein in conjunction with its use in an extrusion apparatus 62 as shown and described with respect to the remaining FIGS., it should be understood that the novel filter element and filter cleaning method as described herein is not limited to use in extrusion apparatus. Also, it may be used to replace existing throw-away filters in presently used apparatus. Typical dimensions of a novel filter element useful for filtering extruded recycled plastic materials are an overall thickness of from $\frac{1}{4}$-$\frac{1}{2}$inch, a small aperture depth of 20-30 mils and a small aperture diameter of 5-8 mils. The distance between centers of the larger apertures is typically in the neighborhood of about 20 mils depending on the size of the aperture while distance between centers of the smaller apertures in each grouping is typically in the range of 8-9 mils. As previously stated, the specific dimensions utilized for any of the apertures or for the filter element itself depends upon the extrusion apparatus or other apparatus into which the filter element is placed and the size of particles desired to be filtered therewith.

Figure 6:
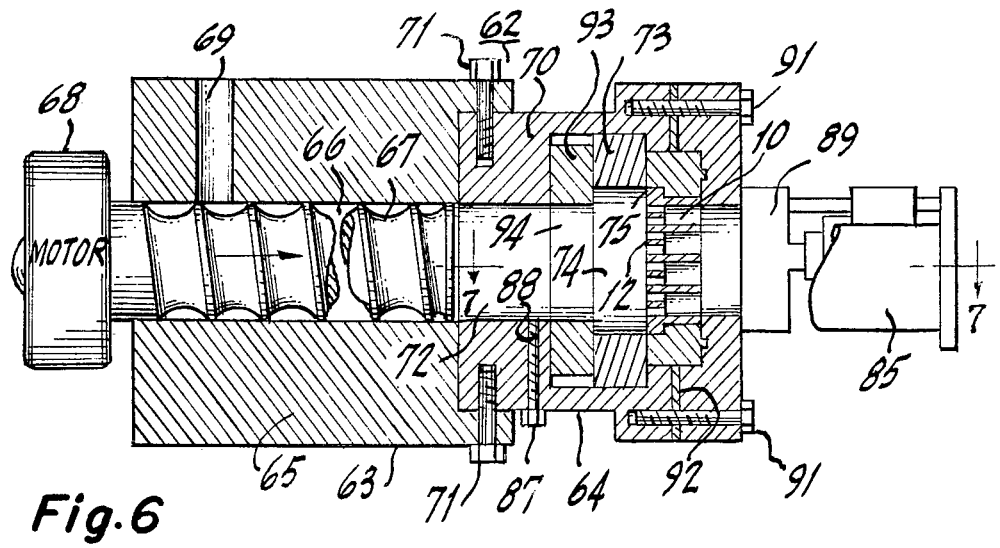
FIG. 6 is a side elevational view principally in section for clarity of an extrusion apparatus including a filter head and associated devices incorporating a novel filter element.
Figure 7:
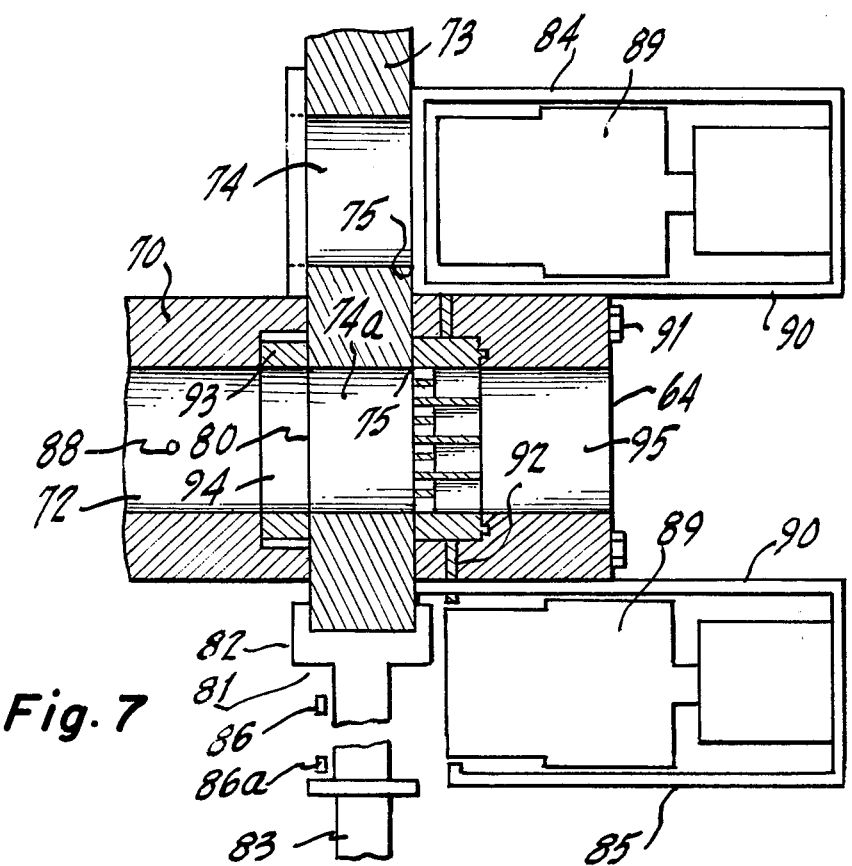
FIG. 7 is a top, primarily cross-sectional view of the filter head and slide assembly incorporated in the extrusion apparatus of FIG. 6 with its associated aperture cleaning devices in elevation with some parts removed for clarity.

Referring to FIG. 6, which is a cross-sectional view of a portion of an extrusion apparatus 63, there is shown as part of the apparatus 62, an extrusion section 63 and a filter head section 64 for filtering the material extruded through the apparatus 62. The extrusion section 63 comprises a housing 65 having a cylindrical cavity 66 extending laterally therethrough and an extrusion screw 67 within the cavity 66. The screw 67 is driven by a motor 68. Material to be extruded is added to the cavity 66 through a passage 69 in the housing 65. The extrudable material is then advanced through the cavity 66 by means of the extrusion screw 67. The advancing material passes from the extrusion section 63 into the filtering head section 64 of the apparatus where the extruded material passes through a filter element 10 so as to remove dirt, debris and particulate matter from the material being extruded. The filter head or section 64 comprises a filter and slide assembly housing 70 which is affixed to the extrusion housing 65 by means of bolts 71, a cavity 72 extending therethrough which is coextensive with cavity 68, a filter element 10, a slide member 73 which is provided with at least two debris accumulating cavities 74, the bottom edges of which act as filter cleaning means 75; means 76 coupled to the filter head for reciprocating the slide member 73 so as to simultaneously clean the filter 10 by scraping its surface 12 while providing a clean accumulation cavity 74 in line with the extrudate and filter 10; and means 76 coupled to the accumulationcavity 74 for cleaning the debris accumulated in the cavity 74 after it has been displaced from the in-line filtering position.

Typically, the filter and slide assembly housing 70 of the filter head 64 surrounds a slide chamber 80. The slide assembly 81 includes means 82 for causing reciprocating sliding movement of the slide member 73 which functions as a combined debris accumulating and filter cleaning means within the slide chamber 80 in a direction perpendicular to the cross section of the extrudate cavity. Such means include a piston and cylinder assembly 83 coupled to the slide member 73. The slide member comprises at least first and second spaced through holes 74 and 74(a), each through hold preferably having a diameter at least equivalent to the active filtering diameter of the filter element 10. Furthermore, both major surfaces of the slide member 73 are flat and fit within the slide assembly housing 70 in a manner to be slidable therein while still maintaining a positive pressure against the flat surface 12 of the filter. In this manner, the bottom edge 75 of each aperture presses against the surface of the filter as the slide 73 is moved from one position to another and acts to scrape the filter surface 12 thereby cleaning it of debris and particulate matter lying thereover by shearing any particles caught in the filter apertures 16 thereby freeing these particles and by physically moving and removing any debris overlying the filter in the accumulating aperture 74.

In a first position of the slide assembly the first aperture 74(a) is so located within the slide chamber 80 as to be aligned between an extrudate inlet cavity 72 in the filter head housing 70 and the filter element 10 contained within the slide chamber 80. Meanwhile, the second recess or aperture 74 in the slide member 73 is located outside of the slide assembly housing 70 at a first side thereof, in a first standby station 84. In a second position of the slide assembly (not shown), the second aperture 74 is so located within the slide chamber so as to take the place of the first aperture 74(a) in the first position between the extrudate inlet opening 72 and the filter element 10. At the same time, the first aperture 74(a) in the slide assembly becomes located outside of the slide assembly housing 70 at a second side thereof in a second standby station 85. A pair of limit switches 86 and 86(a) may be employed in a conventional manner, to indicate that the slide assembly is in its first position or its second position, respectively. In accordance with the present invention, as each aperture 74 and 74(a) is moved from its position between the extrudate inlet and the filter element 10 it causes the debris accumulated in the aperture and particles clogging the filter element 10 to be removed from over the filter element 10, said debris and particles being contained within the slide aperture.

At each standby station 84 and 85, the accumulated debris is ejected from the slide aperture at that station so as to provide a clean, free aperture for movement back into the extrudate stream. The various mechanisms at the first and second standby stations 84 and 85 for cleaning the apertures 74 and 74(a) of the slide 73 are substantially identical. Accordingly, only one such station, the first aperture cleaning station 84, will be described in detail hereinafter. Corresponding elements at the second standby station 85 are designated in the drawing by the same reference numerals.

Changing of the slide member 73 from the first position to the second position can be accomplished automatically by means of a pressure sensing device 87 which senses the pressure in the feed cavity by means of a small hole 88 communicating from inside the cavity 72 to the pressure sensing device 87 outside the cavity 72 such that when the pressure reaches a predetermined value, the slide assembly is automatically caused to change positions, thereby removing the clogged accumulator aperture from the plastic stream and replacing it with a new and clean aperture, while at the same time, cleaning the surface of the filter. Alternatively, the slide member 73 can be moved by means of an automatic timing mechanism which will reciprocate the slide member in a standard predetermined time interval. Also coupled to the slide member 73 at each standby station are punch means for punching out the accumulated debris of the aperture in the respective station. One method of doing this is by means of a horizontally mounted pneumatic punch 89. The punch 89 includes a cylindrically shaped piston having at least at the far end thereof the same diameter as the slide aperture to be cleaned. The punch 89 moves horizontally in a housing 90 which guides the path of the punch 89. The punch 89, upon actuation, for example by means of the limit switch which is activated upon the slide reaching the stop defining its first or second position and is caused to move horizontally by means of the pneumatic pressure applied thereto and enter the respective aperture of the slide 73 so as to remove the accumulated debris therefrom and then reciprocate to its original position outside the slide 73. The slide 73 is then ready for movement into its alternate position upon a signal from the pressure detecting device 87 or timer so as to provide a clean aperture adjacent the filter element.

In order to provide easy removal of the filter element 10 and at the same time provide a means for adjusting the pressure of the slide 73 against the surface of the filter element 10, the filter head 64 may be split into two sections in the area around the central portion of the filter element 10. The two sections are then mounted together by means of adjusting screws 91 and in between the sections lies a compressible gasket 92 such that the pressure between the filter head and the slide can be controlled by means of a torque applied to the mounting screws connecting the two sections of the filter head 64. There is further provided a ring seal such as a beryllium ring 93 on the side of the slide 73 opposite that of the filter element 10. The ring seal 93 is provided with an opening or passageway 94 for the extrudate to continue through the cavity in the filter head 64.

The operation of the apparatus will next be described in detail with reference to a single cycle of operations, beginning with the slide assembly entering into its first position. The extrusion mechanism is currently functioning to discharge an extruded plastic material along the direction of the arrows shown in the extrusion cavity 66. Thus, the extruded plastic material may now begin to advance from the inlet opening 72 in the slide assembly housing 70 through the slide accumulator aperture 74 and thence through a clean filter element 10 retained in fixed relationship with the extrusion cavity such that a filtered plastic material may pass through the apertures of the filter element 10 and exit through the outlet opening 95 in the filter head 64.

Meanwhile, as the slide 73 enters into its first position, debris starts to accumulate in the slide aperture 74 and the pressure in the extrusion cavity is monitored by the pressure sensing device. When the pressure reaches a predetermined point, a switch activates the mechanism to move the slide assembly from its first position to its second position. During this movement, the slide aperture 74 containing debris is moved out of the position adjacent the filter element 10 and the bottom edges 75 of the slide aperture 74 are pressed against the filter element 10 while moving across the filter element 10 thereby scraping the surface of the filter element and shearing any particles in the filter apertures 12 and cleaning the surface of the filter element 10. Simultaneously, the second aperture 74(a) of the slide 73 enters the extrusion path adjacent the filter element 10 until the entire aperture 74(a) rests adjacent the filter element 10 in the second position as controlled by the limit switch 86. When the second position is reached, the punch 89 is activated which cleans the debris which accumulated in the first aperture 74. The slide 73 is then ready for movement back to its original position upon impulse from the pressure switch 87 when the pressure reaches its predetermined level. This process is then continually repeated such that the same filter element 10 is cleaned, the accumulated debris removed and a clean aperture for accumulating debris is provided.

It should be understood that various mechanisms may be employed other than the mechanisms shown herein for cleaning the slide apertures or for causing movement of the slide or detection of the pressure of time for reciprocating the slide. Such means are well known in the art and need not be explicitly set forth herein. Furthermore, various pressure sensing means are also well known in the art and need not be specifically set forth herein. It may further be noted that while a slide assembly is provided as the means for providing a debris accumulating cavity and filter cleaning means, rather than a slide assembly, one may provide other means for accomplishing the same function. For example, one may provide a slotted rotating disc having a plurality of slots which continuously rotates in front of the filter element with pressure against the surface of the filter element so as to provide the necessary debris accumulation cavity and filter scraping or cleaning means.

What is claimed is:

1. A filter assembly comprising:
   (a) a housing for supporting a filter therein;
   (b) a filter supported within said housing and having a flat surface upon which debris accumulates during filtration, said surface capable of being cleaned in situ without substantial wear by scraping said surface;
   (c) movable filter cleaner means mounted within said housing, a part thereof extending beyond said housing and having a plurality of spaced apertures for accummulation therein of debris failing to pass through the filter when such aperture is in alignment with said filter, one surface of the filter cleaning means being juxtaposed to the surface of the filter to be cleaned such that movement of the filter cleaning means causes the edge of the aligned aperture to scrape debris from the filter surface as it moves out of alignment, the spacing of said apertures being such that a clean aperture comes into alignment with the stationary filter as the aperture previously in alignment therewith is moved out of alignment thereby cleaning the filter, removing the accumulated debris from the housing and providing a clean aperture in alignment with the filter; and
   (d) means for cleaning the accumulated debris from the apertures subsequent to moving the apertures out of alignment with said filter.

2. The filter assembly recited in claim 1 wherein said filter cleaning means is slidably mounted within said housing.

3. The filter assembly recited in claim 2 wherein said filter cleaning means is a slide having a plurality of spaced apertures and a flat surface which is in slidable contact with said filter element.

4. The filter assembly recited in claim 3 including means for reciprocating said slide to alternately align said apertures therein over said filter.

5. The filter assembly recited in claim 2 wherein reciprocating means are responsive to means selected from pressure monitoring means and timing means and wherein said means for cleaning clogged apertures is coupled to a slide limit switch.

6. The filter assembly recited in claim 3 wherein the spacing between apertures of said slide is less than the diameter of said apertures.

7. The filter assembly recited in claim 1 including means for coupling said assembly to extrusion means and extrusion means coupled thereto.

8. An extrusion apparatus comprising extrusion means having a material inlet and an extruded material outlet cavity, means mounted therein for filtering material to be extruded, said filtering means being in line with said extrusion means outlet cavity wherein said filter means comprises a filter assembly including:
   (a) a housing for supporting a filter therein;
   (b) a filter supported within said housing and having a flat surface upon which debris accumulates during filtration, said surface capable of being cleaned in situ without substantial wear by scraping said surface;
   (c) movable filter cleaner means mounted when said housing and a part thereof extending beyond said housing and having a plurality of spaced apertures for accumulation thereon of debris failing to pass through the filter when such aperture is in alignment with said filter, one surface of the filter cleaning means being juxtaposed to the surface of the filter to be cleaned such that movement of the filter cleaning means scrapes debris from the filter surface and carries such debris and debris accumulated therein from the housing, the spacing of said apertures being such that a clean aperture comes into alignment with the stationary filter as the aperture previously in alignment therewith is moved out of alignment thereby cleaning the filter and removing the accumulated debris from the housing; and
   (d) means for cleaning the debris containing cavities subsequent to moving said cavities out of alignment with said filter.

9. A process for extruding materials including the steps of passing extrudate in an axial path through a stationary flat surface filter, said surface located perpendicularly to said axial extrudate path and scraping the surface of said filter with the edge of debris cavities in filter cleaning means juxtaposed to said surface of said filter by reciprocating moving action of said filter cleaning means, thereby cleaning the surface of said filter from accumulated debris in situ, while continuing extrusion and thence removing debris accumulated in the cavity of said filter cleaning means and thereafter moving the previously cleaned cavity back into the extrudate path during which time the filter is again caused to be cleaned.

10. The process recited in claim 9 wherein said filter has a flat surface and wherein it is cleaned by scraping action across said flat surface.

11. The process recited in claim 9 wherein the steps of accumulating and cleaning are accomplished by means of a reciprocating slide having a plurality of apertures substantially at least equal in size to the size of said filter, said slide slidably mounted in an assembly so as to contact a surface of said slide with the top surface of said filter and reciprocating said slide to alternate apertures in line with said filter.

12. The process recited in claim 11 including the steps of detecting by time elapse or pressure when to cause reciprocation of said slide, reciprocating said slide in accordance with said detection, automatically cleaning debris accumulated in the slide aperture which is removed from the filter path, reciprocating said slide to return the cleaned slide aperture over the filter while cleaning the aperture then removed from over said filter, cleaning the filter element, in situ, each time said slide is reciprocated.

* * * * *

UNITED STATES PATENT AND TRADEMARK OFFICE
CERTIFICATE OF CORRECTION

PATENT NO. : 4,257,901
DATED : March 24, 1981
INVENTOR(S) : W. E. Rapp

It is certified that error appears in the above—identified patent and that said Letters Patent is hereby corrected as shown below:

Under the section entitled "References Cited", the following reference should appear: —2,607,954 - 8/1952 - G. Schneider et al. -18-15—.

In the specification, Column 5, line 10, "accumulationcavity" should read —accumulation cavity—. Column 7, line 34, "of time" should read —or time—.

In the claims, Column 9, claim 10 (lines 9-11) was cancelled by an amendment and should not appear in the patent.

On the title page, "12 claims" should read — 11 claims —.

Signed and Sealed this

Eleventh Day of August 1981

[SEAL]

Attest:

GERALD J. MOSSINGHOFF

Attesting Officer

Commissioner of Patents and Trademarks